W. C. MASON.
CAMERA ATTACHMENT.
APPLICATION FILED APR. 7, 1920.
1,382,437.
Patented June 21, 1921.
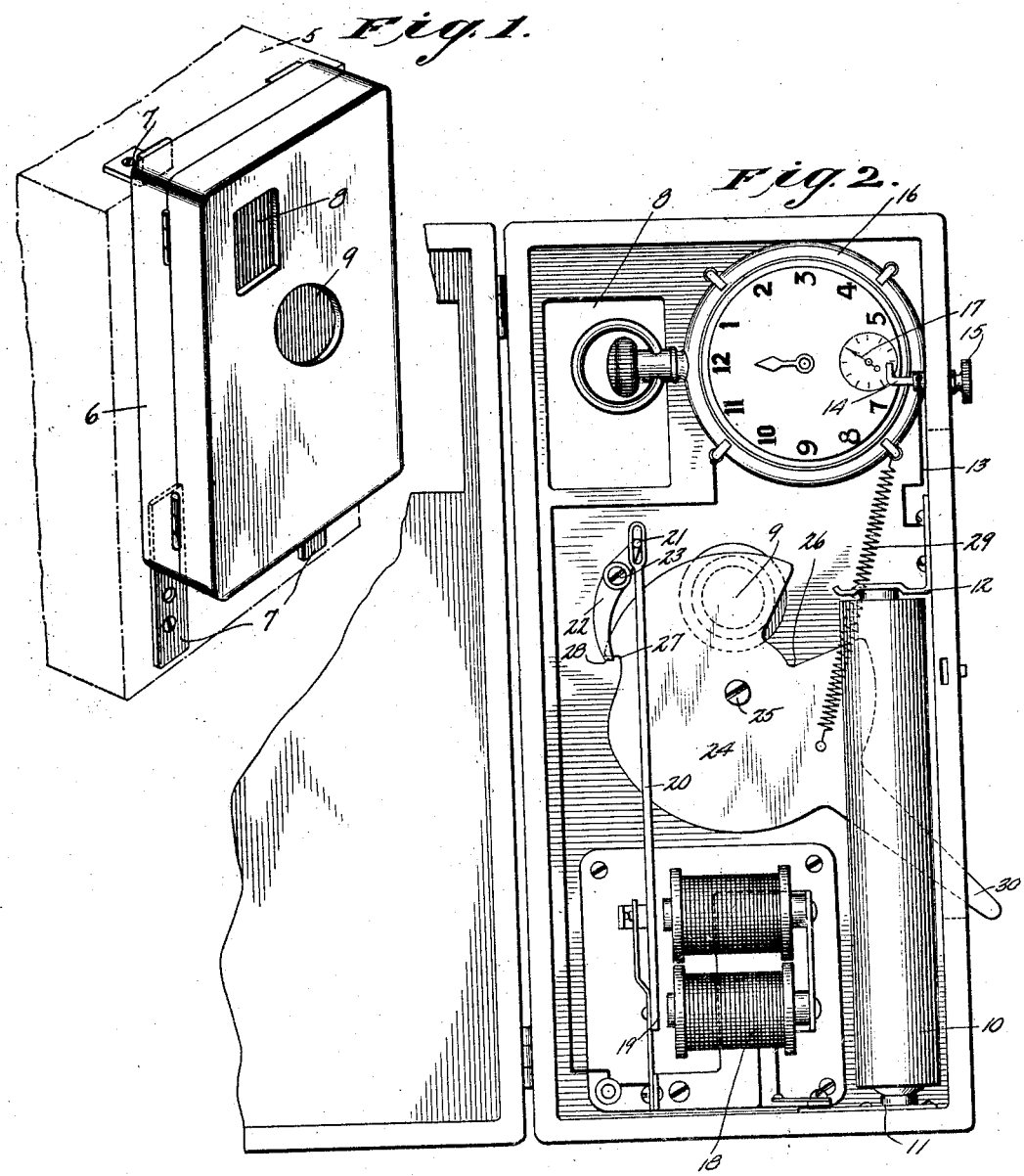
WITNESSES
INVENTOR
WILLIAM C. MASON
BY
ATTORNEYS

UNITED STATES PATENT OFFICE.

WILLIAM CALVIN MASON, OF NEW YORK, N. Y.

CAMERA ATTACHMENT.

1,382,437.  Specification of Letters Patent.  Patented June 21, 1921.

Application filed April 7, 1920.  Serial No. 372,028.

*To all whom it may concern:*

Be it known that I, WILLIAM C. MASON, a citizen of the United States, and a resident of the city of New York, borough of Manhattan, in the county and State of New York, have invented a new and Improved Camera Attachment, of which the following is a full, clear, and exact description.

It is well appreciated that one objection to the present day camera is that the operator cannot be included in a picture, as it is necessary that the camera be manipulated by the operator to produce the desired picture.

To overcome this defect various expedients have been proposed, the most prominent of which are extremely long "Bowden wires" by means of which it is possible for an operator to stand at some distance from the lens of the camera, and to include himself in the picture taken.

Structures such as this have left much to be desired in that it is necessary to at all times carry an extremely long length of cable which renders the picture taking outfit cumbersome.

Other devices have been proposed to permit photography along the lines indicated, but these devices have also not proven adaptable to ordinary circumstances in that they involve the expenditure of a considerable amount of money, and were for the most part cumbersome also.

With these defects in mind I have constructed a camera attachment by means of which the operator may have ample time to position himself within range of the camera which will subsequently be actuated to take the picture desired without further attention.

Reference is had to the attached sheet of drawings as illustrating one practical embodiment of my invention and in which drawings, Figure 1 illustrates my attachment in applied position upon a camera, and Fig. 2 shows my attachment open so as to disclose the construction contained therein.

In these views the reference numeral 5 indicates a camera which for the sake of illustration is of the "box" type. The attachment includes a housing comprising a pair of hinged half-sections 6, the rearmost of which is attached by any suitable means such as lugs 7 to the camera 5.

Referring now specifically to the attachment, it will be seen that both of the half sections 6 of the housing are formed with openings 8 and 9, the former in line with the finder opening of the camera, the latter being in line with the lens block of the same.

A battery or other suitable source of energy 10 is positioned within the housing, and has its terminals contacting with strips 11 and 12 respectively, the latter strip being connected by a wire or other suitable conductor 13 to a switch member including a rotatable arm 14 actuated by a knurled knob 15 extending beyond the housing.

In this connection it is to be noted that a watch or other suitable time controlled element 16 has its second hand 17 rotating directly below the inner end of the arm 14, and that the latter is capable of being turned so as to be engaged by the second hand upon the latter rotating.

The first strip 11 is connected to an electromagnet 18 controlling an armature 19 from whence the circuit extends within the housing to a point at which it is grounded against the watch, 16.

The armature 19 controlled by the magnet 18 is extended, as has been indicated at 20, and is connected as at 21 to one end of a lever 22 pivotally secured as at 23 intermediate its extremities to the housing.

A plate 24 rotatably mounted as at 25 within the housing normally covers the opening 9, such plate being provided with a notched portion 26, which upon the plate 24 being rotated permits an uncovering of the opening 9. The plate 24 is further formed with a shoulder 27, which shoulder is adapted to be engaged by the intermediate end 28 of the lever 22, the plate 24 being normally held in the position indicated in Fig. 2 by virtue of such engagement.

A spring 29 extends between, and has its end secured to the plate 24, and the housing, and serves to rotate the plate 24 to snap the notched portion 26 thereof past the opening 9, this plate being prevented from moving as aforedescribed. The plate 24 is further formed with an arm portion 30 which extends through a slot in the side edge of the housing, and by means of which the plate 24 may be manually operated.

It will now be appreciated, that in operation the armature 19, by virtue of the spring mounting, will tend to rock the lever 22 so that the inturned end of the same will tend to engage the shoulder 27 of the plate 24. The plate is rotated by means of the arm 30 so that this engagement may take place, and it will be appreciated that the plate will be held in this position against the action of the spring 29, by means of the specified engagement.

The camera may now be sighted, and the shutter of the same open, the entrance of light through the lens of the camera being precluded by means of the plate 24. The operator, now desiring to be included in the picture sets the timing element in operation, at the same time turning the knob 15 so that the arm 14 extends to a position at which it will be engaged by the second hand 17.

The operator now has over fifty seconds in which to place himself within the range of the picture to be taken, and upon the second hand 17 coming in contact with the arm 14 it will be appreciated that the circuit through the magnet 18 will be closed, which will result in an actuation of the armature 20, causing a disengagement of the shoulder 27 on the part of the lever 22, which will permit the spring 29 to snap the plate 24 so that the notched portion 26 thereof will be passed quickly in front of the opening 9 of the casing 6. This action will result in a normal exposure, and it will be understood that the notched portion might be made smaller or larger, according to the picture to be taken so as to obtain varying lengths of exposure.

It further will be understood that the various parts of my attachment might be modified or re-arranged within the casing so as to adapt this attachment to a number of different makes of cameras. Further, it will be understood that the attachment might be adapted for a number of various uses extraneous from a camera.

I claim—

A camera attachment, including a housing formed with openings alining with one another and with the lens opening of a camera, a movable plate formed with notched portions, the body of said plate normally covering said housing openings, said plate being formed with a shoulder, a lever formed with an inturned end, said inturned end being adapted to engage said shoulder, an electromagnet, an armature controlled by said electromagnet and having its outer end secured to the opposite end of said lever, a source of energy within said housing, a spring tending to move said plate to pass said notched portions past the lens opening, a time controlled device also within said housing, and means adapted to coöperate with said time controlled device to close the circuit through said magnet whereby to permit said plate to rotate.

WILLIAM CALVIN MASON.